(12) United States Patent
Lien et al.

(10) Patent No.: US 12,459,150 B2
(45) Date of Patent: Nov. 4, 2025

(54) SAWING DEVICE ALLOWING SAW BLADE TO BE RETRACTED

(71) Applicant: Yu-Tzu Liu, Taichung (TW)

(72) Inventors: Shih-Hui Lien, Taichung (TW); Yi-Li Cheng, Taichung (TW); Chieh-Yuan Tsai, Taichung (TW)

(73) Assignee: Yu-Tzu Liu, Taichung (TW)

( * ) Notice: Subject to any disclaimer, the term of this patent is extended or adjusted under 35 U.S.C. 154(b) by 327 days.

(21) Appl. No.: 18/076,765

(22) Filed: Dec. 7, 2022

(65) Prior Publication Data
US 2024/0116204 A1 Apr. 11, 2024

Related U.S. Application Data

(60) Provisional application No. 63/413,369, filed on Oct. 5, 2022.

(51) Int. Cl.
| | | |
|---|---|---|
| *B26D 7/24* | (2006.01) | |
| *B26D 1/00* | (2006.01) | |
| *B26D 1/15* | (2006.01) | |
| *B26D 7/26* | (2006.01) | |

(52) U.S. Cl.
CPC ............. *B26D 7/24* (2013.01); *B26D 1/0006* (2013.01); *B26D 1/15* (2013.01); *B26D 7/2621* (2013.01); *B26D 2001/0046* (2013.01)

(58) Field of Classification Search
CPC .......... B26D 7/24; B26D 1/0006; B26D 1/15; B26D 7/2621; B26D 2001/0046; B23D 45/042; B23D 47/02; B23D 47/04; B23D 47/08; B23D 47/12; Y10T 83/762
See application file for complete search history.

(56) References Cited

U.S. PATENT DOCUMENTS

| | | | | |
|---|---|---|---|---|
| 6,119,569 | A * | 9/2000 | Benedict ................ | B27G 19/02 |
| | | | | 83/DIG. 1 |
| 6,813,983 | B2 * | 11/2004 | Gass ........................ | B27B 5/38 |
| | | | | 83/477.1 |
| 7,100,483 | B2 * | 9/2006 | Gass ........................ | F16P 3/12 |
| | | | | 83/DIG. 1 |
| 7,290,472 | B2 * | 11/2007 | Gass ........................ | B27B 5/38 |
| | | | | 83/477.2 |
| 9,969,099 | B2 * | 5/2018 | O'Banion ............. | B27G 19/08 |
| 2002/0017179 | A1 * | 2/2002 | Gass .................... | B23D 59/001 |
| | | | | 83/DIG. 1 |
| 2007/0074611 | A1 * | 4/2007 | Hu ........................... | B27B 5/29 |
| | | | | 83/485 |

* cited by examiner

*Primary Examiner* — Jonathan G Riley
(74) *Attorney, Agent, or Firm* — Birch, Stewart, Kolasch & Birch, LLP

(57) ABSTRACT

A biaxial type sawing device includes a base, a worktable, a sawing unit, and a braking block. The worktable is disposed on the base for supporting a workpiece. The sawing unit has saw arm provided with a bottom end thereof pivoted to the worktable through a first shaft, a saw blade box pivoted to the top end of the saw arm through a second shaft, a motor assembled with the saw blade box, and a saw blade connected with the motor and partially covered by the saw blade box. The braking block is adjacent to the saw blade and pivoted to the second shaft. Therefore, when the saw blade touches an operator's hand, the braking block is triggered to press the saw blade, such that the saw blade is retracted away from the operator's hand together with the saw blade box, thereby enhancing safety in use.

5 Claims, 5 Drawing Sheets

SAWING DEVICE ALLOWING SAW BLADE TO BE RETRACTED

BACKGROUND OF THE INVENTION

1. Field of the Invention

The present invention relates to a sawing device and more particularly, to a biaxial sawing device with an emergency stop function.

2. Description of the Related Art

When a conventional sawing device is operated, first a workpiece is placed on a worktable, and then a motor is started to rotate the saw blade. Thereafter, the saw blade is driven by a saw arm to move towards the worktable for sawing the workpiece. However, during sawing of the workpiece, an operator's hand may be cut by the saw blade due to carelessness. Most conventional sawing devices do not have security mechanisms or have security mechanisms that cannot respond immediately, so once the saw blade touches the operator's hand, it will cause serious damage to the operator's hand. Therefore, the conventional sawing device needs to be improved in terms of safety in use.

SUMMARY OF THE INVENTION

It is a primary objective of the present invention to provide a biaxial sawing device, which has an emergency stop function for enhancing safety in use.

To attain the above objective, the biaxial sawing device of the present invention comprises a base, a worktable, a sawing unit, and a brake. The worktable is disposed on the base for support a workpiece. The sawing unit includes a saw arm, a saw blade box, a motor, and a saw blade. The bottom end of the saw arm is pivotally connected with the worktable through a first shaft, such that the saw arm is pivotable about the first shaft with respect to the worktable. The saw blade box is adjacent to the bottom side of the saw arm and pivotally connected with the top end of the saw arm through a second shaft, such that the saw blade box is pivotable about the second shaft with respect to the saw arm. The motor is assembled with one side of the saw blade box so as to be moved together with the saw blade box. The saw blade is connected to the motor and partially covered by the saw blade box, such that the saw blade is driven by the motor to rotate and driven by the saw arm to be pivotable between an initial position and a sawing position with respect to the worktable. The brake includes a braking block adjacent to the top of the saw blade and having one end thereof pivotally connected with the second shaft for stopping the saw blade.

It can be seen from the above that when the biaxial sawing device of the present invention is in normal use, an operator uses the saw arm to drive the saw blade to pivot about the first shaft towards the worktable for sawing the workpiece. When the saw blade touches an object that is not the workpiece (such as the operator's hand), the braking block presses the saw blade to stop the saw blade. At this time, the kinetic energy generated by the instantaneous stop of the saw blade rotated at high speed will transfer to the saw blade box, such that the saw blade and the saw blade box are pivoted away from the worktable about the second shaft, thereby letting the saw blade leave the object. By this way, the purpose of enhancing safety in use can be achieved.

Preferably, the first shaft is secured to a reinforcement board fixed to worktable.

Preferably, the saw arm has a hollow portion penetrating through the top and bottom sides of the saw arm. When the saw blade is moved away from the worktable to a retracted position, a part of the saw blade box protrudes out of the top side of the saw blade box through the hollow portion for preventing the saw blade box from colliding with the saw arm.

Preferably, the sawing unit further including a pin mounted to the saw arm and a hook mounted to the saw blade box. When the saw blade is located at the initial position and the sawing position, the hook is engaged with the pin, such that the operator can use the saw blade stably to saw the workpiece. When the saw blade is moved away from the worktable to a retracted position, the hook is disengaged from the pin.

Preferably, at least one heat radiating hole is provided at one side of the saw blade box facing away from the motor for providing a heat radiating effect to the saw blade in operation.

Preferably, a controller electrically is connected with the motor and the brake for controlling operation of the motor and the brake. When the saw blade touches the object that is not the workpiece (such as the operator's hand), the controller controls the motor to stop and controls the braking block to press the saw blade.

Other advantages and features of the present invention will be fully understood by reference to the following specification in conjunction with the accompanying drawings, in which like reference signs denote like components of structure.

DETAILED DESCRIPTION OF THE INVENTION

In the following, the technical content and features of the present invention will be described in detail by enumerating preferred embodiments in conjunction with the drawings. The directional adjectives such as "top, bottom, up, down, inside, outside" mentioned in the content of this specification are only exemplary descriptive terms based on the normal direction of use, and are not intended to limit the scope of the claim. Secondly, in the embodiments and drawings that will be introduced below, the same element numbers represent the same or similar elements or their structural features, and location terms include, but are not limited to, arrangement, proximity, connection, or adjacency.

Figure 1:
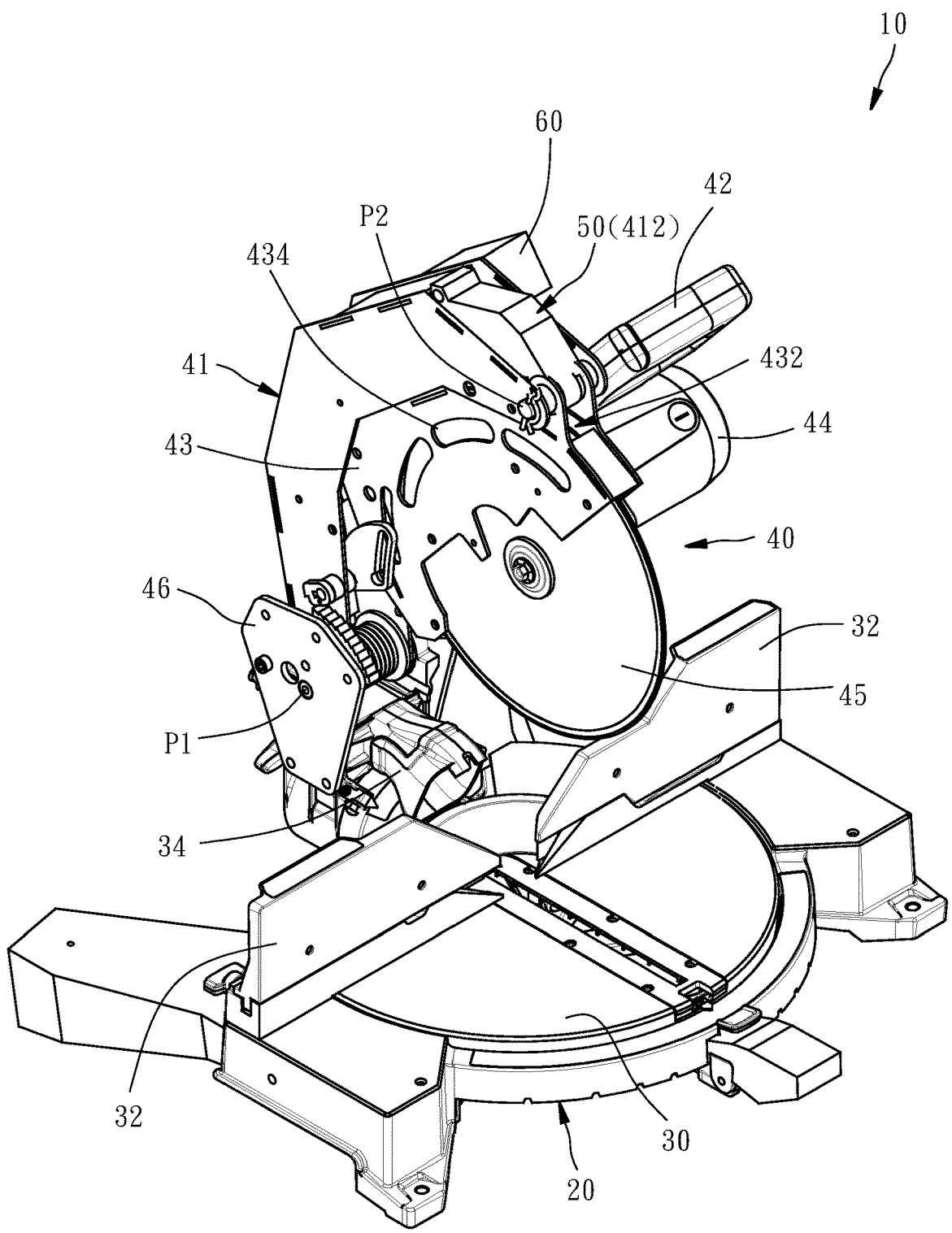
FIG. 1 is a perspective view of a biaxial sawing device of the present invention.
Figure 2:
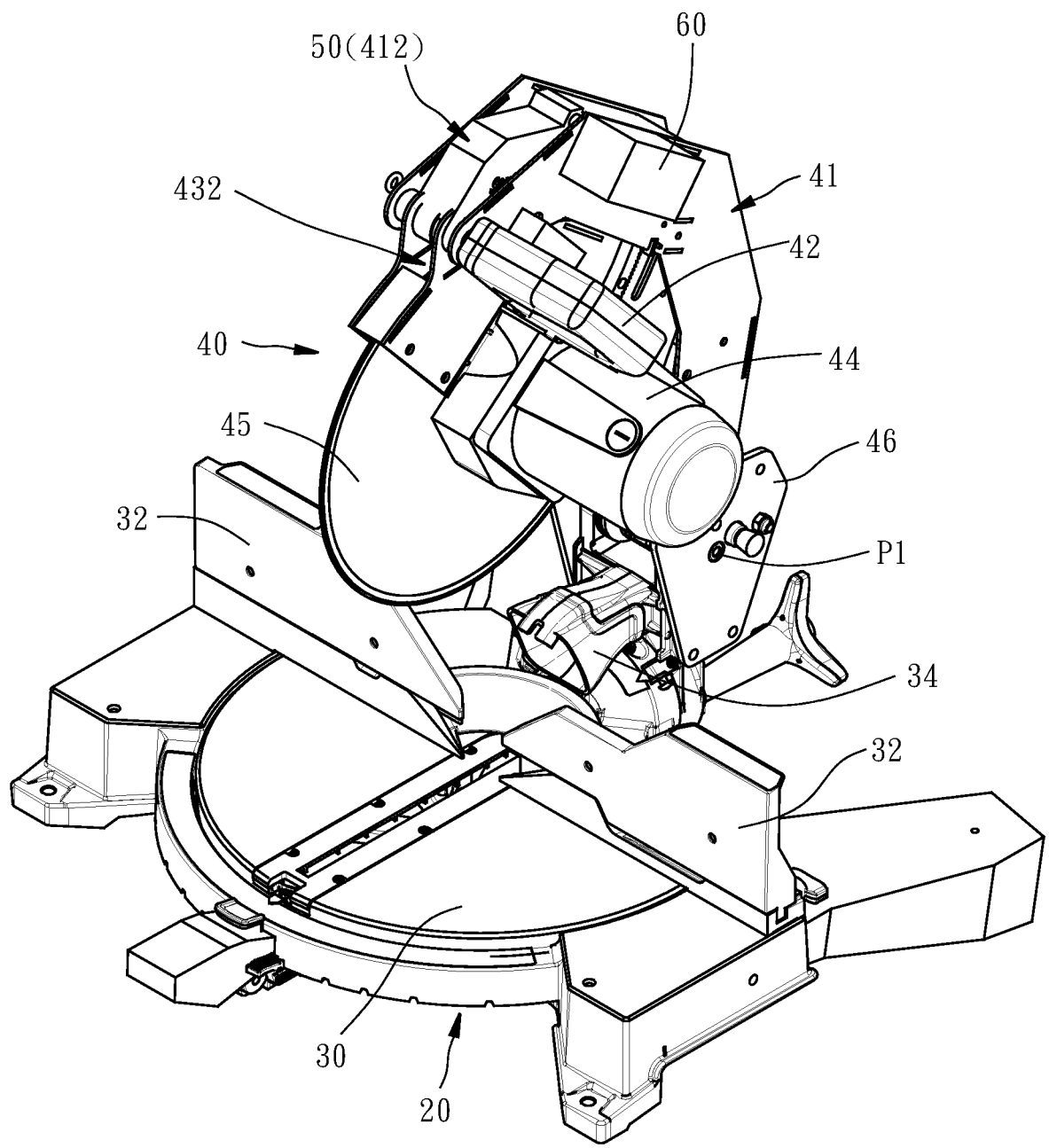
FIG. 2 is another perspective view of the biaxial sawing device of the present invention, showing that the biaxial sawing device is viewed from another perspective.

Referring to FIGS. 1 and 2, a biaxial sawing device 10 of the present invention comprises a base 20, a worktable 30, a sawing unit 40, and a brake 50.

The worktable 30 is disposed on the top surface of the base 20 for supporting a workpiece W. Two opposite fences 32 are provided at the top surface of the worktable 30 and abutted against one side of the workpiece W for providing a positioning effect to the workpiece W. In addition, a chip collecting tube 34 is provided at the rear end of the worktable 30 for collecting and discharging the chip of the workpiece W to the outside of the worktable 30.

Figure 3:
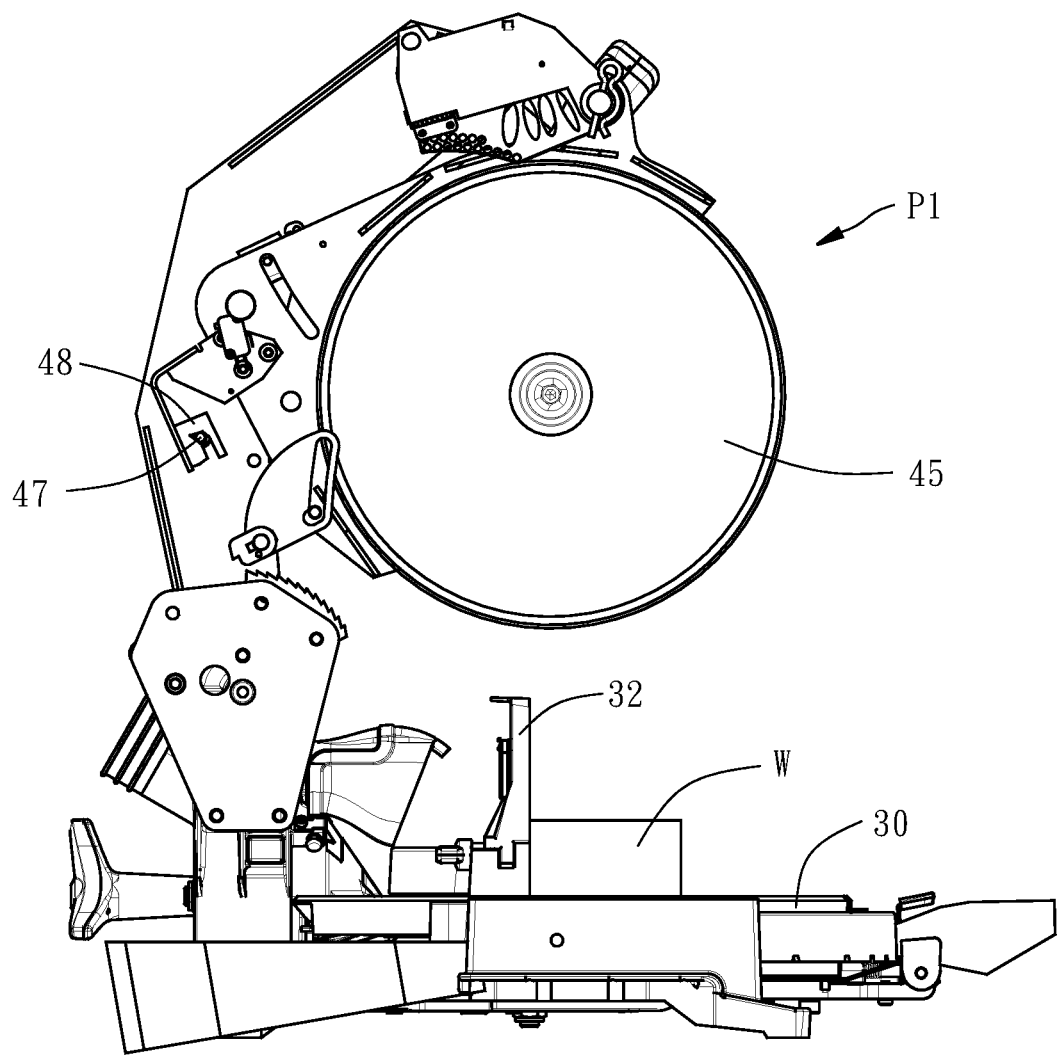
FIG. 3 is a lateral view of the biaxial sawing device of the present invention, showing that the saw blade is located at an initial position.
Figure 4:
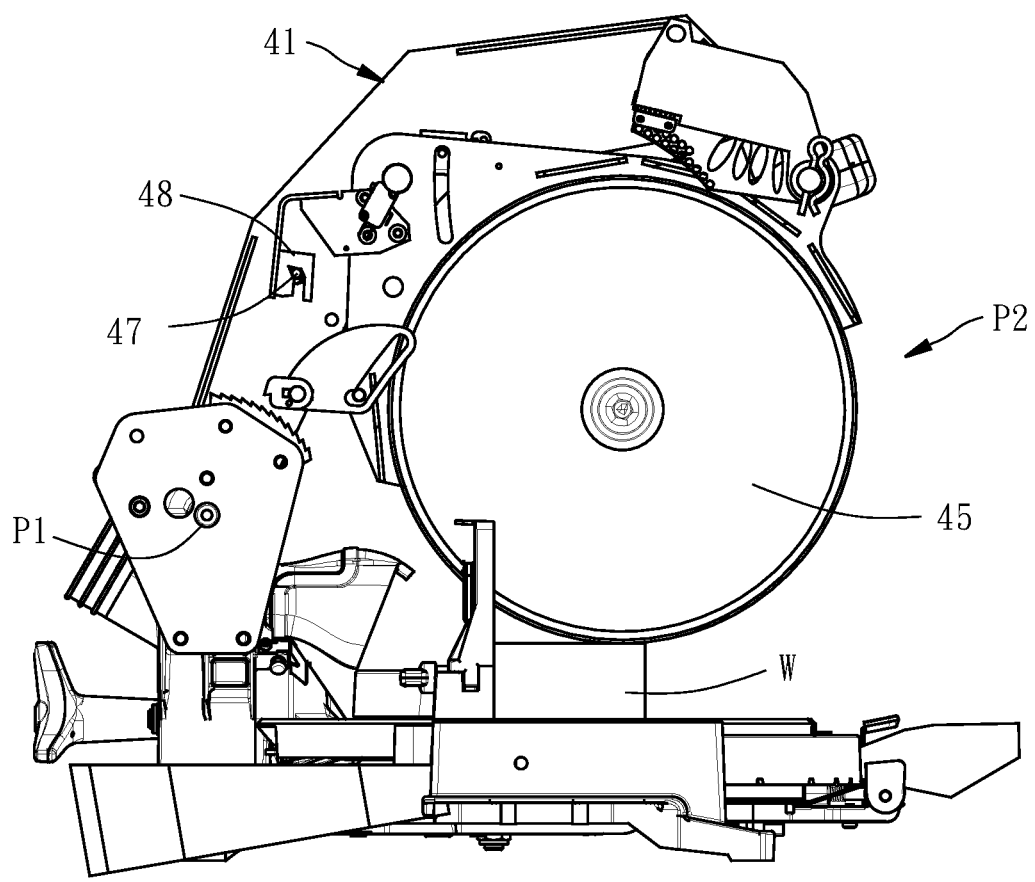
FIG. 4 is similar to FIG. 3, showing that the saw blade is located at a sawing position.

The sawing unit 40 includes a saw arm 41, a handle 42, a saw blade box 43, a motor 44, and a saw blade 45. The bottom end of the saw arm 41 is pivotally connected with two opposite reinforcement boards 46 fixed to two opposite sides of the chip collecting tube 34 of the worktable 30. Further, the top end of the saw arm 41 has a receiving notch 412 penetrating through the top and bottom sides thereof, and the middle of the saw arm 41 has a hollow portion 414 penetrating through the top and bottom sides thereof. The handle 42 is fixed to the rear side of the saw arm 41 for driving the saw arm 41 to pivot about the first shaft P1 upwards and downwards relative to the worktable 30. The saw blade box 43 is adjacent to the bottom side of the saw arm 41 and pivotally connected with the saw arm 41 through a second shaft P2. The top end of the saw blade box 43 has a braking notch 432 penetrating through the top and bottom sides thereof, and the front surface of the saw blade box 43 has a plurality of curved heat radiating holes 434. The motor 44 is mounted to the rear side of the saw blade box 43 and located under the handle 42 and electrically connected with a controller 60 disposed to the saw arm 41, such that the motor 44 can be started by the controller 60. The saw blade 45 is connected to the motor and partially covered by the saw blade box 43, such that the saw blade 45 is driven by the motor 44 to rotate and driven by the saw arm 41 to pivot between an initial position P1 as shown in FIG. 3 and a sawing position P2 as shown in FIG. 4 with respect to the worktable 30.

The brake 50 is received in the receiving notch 412 of the saw arm 41, including a braking block 52 adjacent to the top of the saw blade 45 and having one end thereof pivotally connected with the second shaft P2. By this way, under the control of the controller 60, the braking block 52 is pushed by an elastic force to pivot downwards about the second shaft P2 and press the saw blade 45 for providing a braking effect to the saw blade 45.

Figure 5:
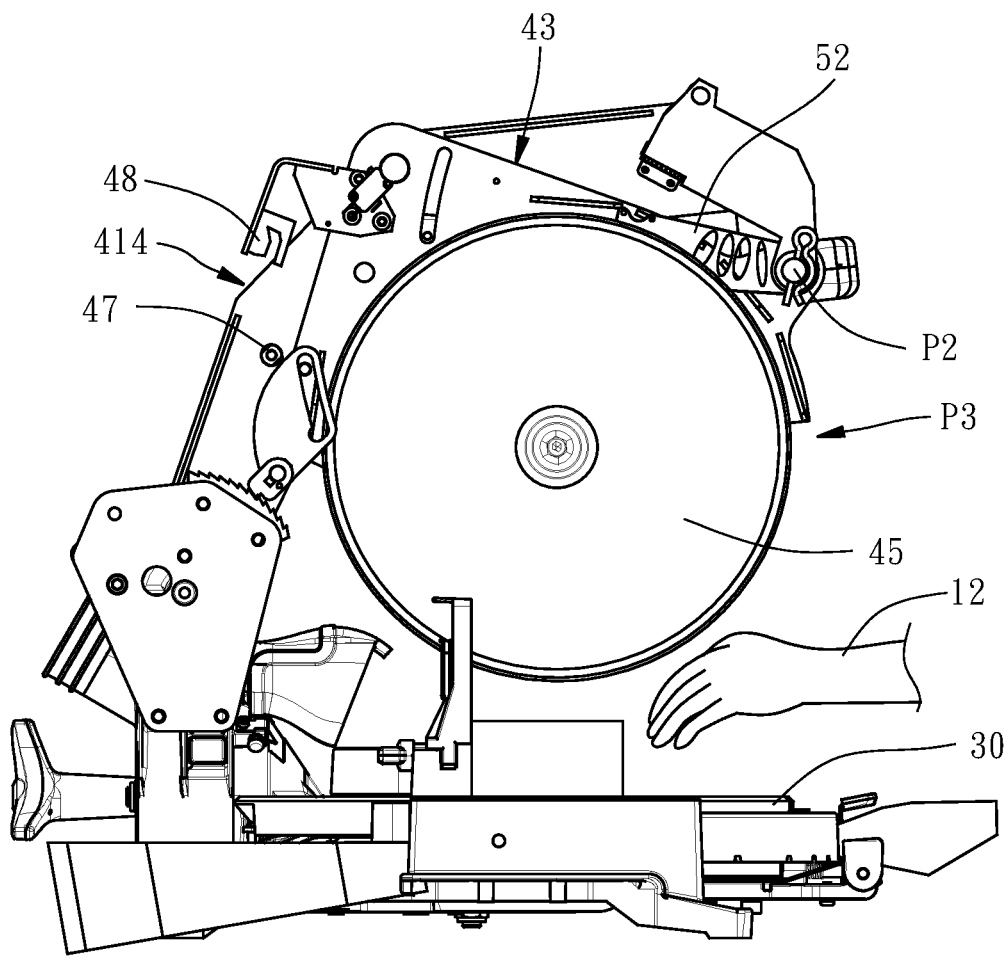
FIG. 5 is similar to FIG. 4, showing that the saw blade is located at a retracted position.

In actual operation, first the workpiece W is placed on the worktable 30 and abutted against the fences 32 to be positioned, and then the saw blade 45 is driven by the motor 44 to rotate. Thereafter, the saw arm 41 is driven by the handle 42 to pivot downwards towards the worktable 30, such that the saw blade 45 is driven by the saw arm 41 to move from the initial position P1 as shown in FIG. 3 to the sawing position P2 as shown in FIG. 4 for sawing the workpiece W. Once the saw blade 45 touches an object 12 that is not the workpiece W (such as an operator's hand) during sawing, the controller 60 receives a signal generated by different voltage value changes or resistance value changes between the workpiece W and the object 12 to control the braking block 52 to press the saw blade 45, thereby stopping the saw blade 45. At this time, the kinetic energy generated by the instantaneous stop of the saw blade 45 rotated at high speed will transfer to the saw blade box 43, such that the saw blade 45 and the saw blade box 43 are pivoted away from the worktable 30 about the second shaft P2 to a retracted position P3 as shown in FIG. 5, thereby letting the saw blade 45 leave the object 12.

On the other hand, the sawing unit 40 further including a pin 47 mounted to the saw arm 41 and a hook 48 mounted to the saw blade box 43. When the saw blade 45 is located at the initial position P1 as shown in FIG. 3 and the sawing position P2 as shown in FIG. 4, the hook 48 is engaged with the pin 47, such that the operator can use the saw blade 45 stably to saw the workpiece W. When the saw blade 45 is located at the retracted position P3 as shown in FIG. 5, the hook 48 is driven by the saw blade box 43 to disengage from the pin 47.

As indicated above, in the biaxial type sawing device 10 of the present invention, when the saw blade 45 touches the operator's hand during sawing, the braking block 52 is triggered to press the saw blade 45 for enabling the saw blade 45 to move away from the operator's hand, thereby achieving the purpose of enhancing safety in use.

What is claimed is:

1. A sawing device comprising:
    a base;
    a worktable disposed on the base for support a workpiece;
    a sawing unit including a saw arm having a bottom end thereof pivotally connected with the worktable through a first shaft, a saw blade box disposed adjacent to a bottom side of the saw arm and pivotally connected with the saw arm through a second shaft, a motor mounted to one side of the saw blade box, and a saw blade connected to the motor and partially covered by the saw blade box, such that the saw blade is driven by the motor to rotate and the saw blade is driven by the saw arm to be pivotable between an initial position and a sawing position with respect to the worktable; and
    a braking block disposed adjacent to a top of the saw blade and located in a braking notch of the saw blade box and having one end thereof pivotally connected with the second shaft, wherein when the saw blade touches an object that is not the workpiece, the braking block presses against the saw blade to stop rotation of the saw blade, and a kinetic energy generated by the instantaneous stop of the saw blade drives the saw blade box together with the saw blade to pivot around the second shaft in the direction away from the worktable to a retracted position, thereby letting the saw blade leave the object,
    wherein a top side of the saw arm has a hollow portion; when the saw blade is moved away from the worktable to the retracted position, a part of the saw blade box protrudes out of the top side of the saw arm through the hollow portion.

2. The sawing device as claimed in claim 1, wherein the first shaft is secured to a reinforcement board fixed to worktable.

3. The sawing device as claimed in claim 1, wherein the sawing unit further including a pin mounted to the saw arm and a hook mounted to the saw blade box; when the saw blade is located at the initial position and the sawing position, the hook is engaged with the pin, and when the saw blade is moved away from the worktable to a retracted position, the hook is disengaged from the pin.

4. The sawing device as claimed in claim 1, wherein at least one heat radiating hole is provided at one side of the saw blade box facing away from the motor.

5. The sawing device as claimed in claim 1, furthering comprising a controller electrically connected with the motor and the brake for controlling operation of the motor and the brake.

* * * * *